United States Patent [19]
Akamine et al.

[11] Patent Number: 5,489,774
[45] Date of Patent: Feb. 6, 1996

[54] COMBINED ATOMIC FORCE AND NEAR FIELD SCANNING OPTICAL MICROSCOPE WITH PHOTOSENSITIVE CANTILEVER

[75] Inventors: Shinya Akamine, Palo Alto, Calif.; Hirofumi Yamada, Tsukuba, Japan

[73] Assignee: The Board of Trustees of the Leland Stanford University, Stanford, Calif.

[21] Appl. No.: 309,021

[22] Filed: Sep. 20, 1994

[51] Int. Cl.⁶ .................... H01J 3/14; G01B 5/28
[52] U.S. Cl. ............... 250/234; 250/306; 359/368; 73/105
[58] Field of Search ................ 250/216, 234, 250/306, 309–311; 359/368; 73/618, 620, 105; 356/373, 375, 376

[56] References Cited

U.S. PATENT DOCUMENTS

| | | | |
|---|---|---|---|
| 4,941,753 | 7/1990 | Wickramasinghe | 250/307 |
| 5,294,804 | 3/1994 | Kojimura | 356/373 |
| 5,319,960 | 6/1994 | Gamble et al. | 73/105 |
| 5,319,977 | 6/1994 | Quate et al. | 250/306 |
| 5,381,101 | 1/1995 | Bloom et al. | 250/306 |
| 5,406,832 | 4/1995 | Gamble et al. | 73/105 |

FOREIGN PATENT DOCUMENTS

| | | | |
|---|---|---|---|
| 404188022A | 7/1992 | Japan | 356/373 |

*Primary Examiner*—Stephone B. Allen
*Attorney, Agent, or Firm*—Flehr, Hohbach, Test, Albritton & Herbert

[57] ABSTRACT

A combined atomic force and near field microscope assembly for atomic level inspection of a target object. The assembly includes a scanning probe with a sharp tip and a photosensitive region on its lower surface. A sample is disposed on a glass substrate and exposed to an evanescent wave generated on the glass substrate by total internal reflection. An optical probe comprising a microfabricated cantilever having an apex in close proximity to a photosensitive region is disposed in close proximity to a sample. The photosensitive region collects light generated by FTR at the apex of the optical probe due to local disruptions of the evanescent field caused by the probe tip. A cantilever displacement mechanism is included so as to allow for operation in a second mode as a conventional atomic force microscope.

21 Claims, 5 Drawing Sheets

COMBINED ATOMIC FORCE AND NEAR FIELD SCANNING OPTICAL MICROSCOPE WITH PHOTOSENSITIVE CANTILEVER

The present invention relates generally to near-field scanning optical microscopy (NSOM) and atomic force microscopy (AFM), and particularly to an AFM/NSOM microscopy assembly having a photosensitive cantilever which combines features of near-field scanning optical microscopy with that of atomic force microscopy.

BACKGROUND OF THE INVENTION

An atomic force microscope (AFM) scans over the surface of a sample. Typically, in the "contacting mode" of operation, a sharp tip is mounted on the end of a cantilever and the tip rides on the surface of a sample with an extremely light tracking force, on the order of $10^{-5}$ to $10^{-10}$ N. Profiles of the surface topography are obtained with extremely high resolution. Images showing the position of individual atoms are routinely obtained. In a second mode of operation, the tip is held a short distance, on the order of 5 to 500 Angstroms, from the surface of a sample and is deflected by various forces between the sample and the tip; such forces include electrostatic, magnetic, and van der Waals forces.

Atomic force microscopy is capable of imaging conductive as well as insulating surfaces with atomic resolution. Typical AFM's have a sensitivity of 0.1 Angstrom in the measurement of displacement, and a spring constant of about 1 Newton per meter (1N/m). Further, the cantilever must be mounted so that the cantilever can approach and contact a sample.

Several methods of detecting the deflection of the cantilever are available which have sub-angstrom sensitivity, including vacuum tunneling, optical interferometry, optical beam deflection, capacitive and resistive techniques. One such technique is described in PCT Patent Document WO 9212398, "Piezoresistive Cantilever For Atomic Force Microscopy", published Jul. 23, 1992 (PCT Application No. 91US9759), which is incorporated herein by reference.

There has been prior work in the field of near-field scanning optical microscopy. N. Van Hulst, M. Moer, O. Noordman, R. Tack, F. Segerink and B. Bolger have demonstrated a system for a near field scanning optical microscope using a microfabricated silicon-nitride probe integrated on a cantilever as originally developed for atomic force microscopy. N. Van Hulst, M. Moer, 0. Noordman, R. Tack, F. Segerink and B. Bolger, "Field Optical Microscope Using a Silicon Nitride Probe," Applied Physics Letter, Vol. 62, No. 5, 1 Feb. 1993, pp. 461–463. The fixed cantilever design disclosed allowed for routine close contact near field imaging on arbitrary surfaces without tip destruction. This alternative near field microscope utilized a photomultiplier and pinhole adjustment means in the imaging plane to collect light propagated at the probe apex. Light scattered in response to the probe disturbing an induced field of an evanescent wave generated on a glass substrate beneath the sample was focused and then collected at a distance from the sample. Accordingly, light generated by frustrated total internal reflection (FTR) at the apex to be collected by a photomultiplier was utilized to reveal sub-Angstrom topography for a given sample.

The previously cited prior art methods for collecting light generated by FTR are cumbersome and inefficient. Experimentation by the inventors of the present invention revealed that the prior art near-field optical microscope with silicon nitride cantilever probe of Hulst et al. described above, transmits a majority of the light to the photomultiplier through the nitride cantilever. Experimentation by the inventors of the present invention also revealed that by placing a metallic gold coating over the probe no signal appeared at the photomultiplier, even for relatively tall probe tips. If light were being scattered around the cantilever by the probe tip, then the gold coating would have had little effect on the photomultiplier signal. Similarly, it was discovered that the signal level at the photomultiplier is affected more strongly by tip radius than by exponential decay of the evanescent field. Accordingly, most of the light being transmitted to the photomultiplier for detection is in fact transmitted through the nitride cantilever. Understanding this relationship allows for an improved detection and collection scheme over that described in the prior art.

The present invention improves on the prior art near field scanning optical microscopes and atomic force microscopes by providing a conventional atomic force microscope including a conventional cantilever having a probe and displacement means for performing either "non-contact" or "contact" mode measurements. In addition the present invention includes an integrated photosensitive element embedded in the cantilever for efficiently detecting light generated at the probe apex and transforming said light energy into electrical signals for ease of amplification and transmission in signal analysis. The present invention eliminates the need for lenses, pinholes and photomultipliers. The present invention has demonstrated resolution well beyond the limits of diffraction, with resolution as high as one seventieth (1/70th) of an optical wavelength.

SUMMARY OF THE INVENTION

It is the object of the present invention to provide an improved method of detecting and collecting light in combined near field scanning optical and atomic force microscopy or in combined near field scanning optical and scanning tunneling microscopy.

It is a further object to provide a cantilevered probe having a built in photosensor for detecting light scattered or otherwise generated near the surface of a sample.

In summary, the present invention is a combined atomic force and near field scanning optical microscope assembly for atomic level inspection of a target object. The assembly includes a scanning probe with a sharp tip and a photosensitive region on its lower surface. A sample is typically disposed on a glass (or other optically transparent) substrate and exposed to an evanescent wave generated on the glass substrate by total internal reflection. An optical probe comprising a microfabricated cantilever having an apex in close proximity to a photosensitive region is disposed in close proximity to a sample for detecting light generated by FTR at the apex of the optical probe due to local disruption of the optical evanescent field by the probe. A cantilever displacement mechanism is included so as to allow for operation in a second mode as a conventional atomic force microscope.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Since the present invention concerns atomic force microscopy (AFM) as well as scanning tunneling microscopy (STM) and near field scanning optical microscopy (NSOM), a shod description of the physical apparatus used in AFM, STM and NSOM is provided for those not familiar with this prior art.

AFM operation

Figure 1:
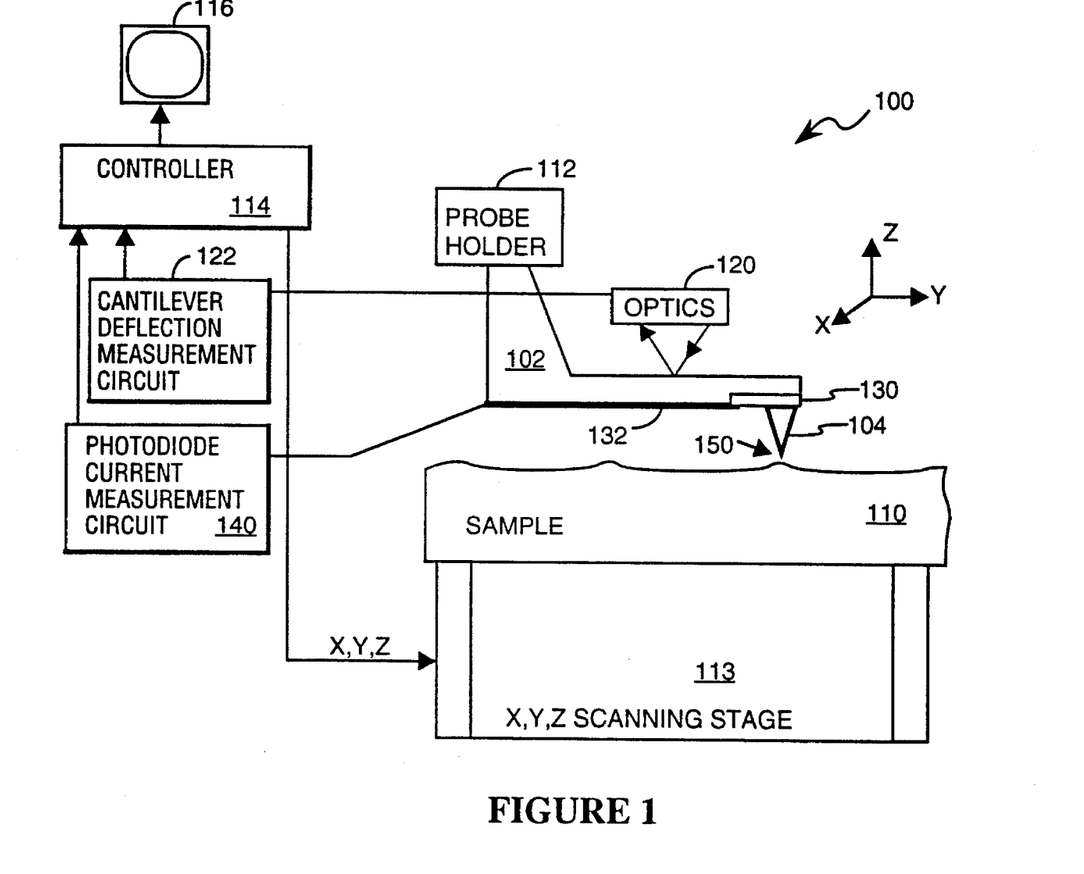
FIG. 1 is a block diagram of an atomic force microscope.

Referring to FIG. 1, there is shown a conceptual diagram of an atomic force microscope 100 incorporating both AFM and near field optical sensors. A microminiature cantilever arm 102 with a sharp tip 104 at its free end is used to probe the surface of a sample 110. In some preferred embodiments the tip 104 is simply the apex of the cantilever 102 and does not project out from the cantilever. Furthermore, as will be described below, the tip 104 may be substantially transparent, or may be doped so as to function as a photodiode.

In the preferred embodiments, the sample 110 is mounted on an XYZ scanning stage 113. This is a "piezo scanning tube" type of stage, which uses piezoelectric actuators to precisely move the sample 110 in the X, Y and Z directions. The cantilever 102 is kept stationary while an XYZ scanning stage 113 moves the sample 110 so as to scan the sample's surface. Those ordinarily skilled in the art will recognize that a separate Z translator apparatus for moving the probe 102 up and down relative to the sample 110 may also be utilized in lieu of a three axis scanning stage 113. Alternately, the sample's surface can be scanned using a probe holder 112 that functions as an XYZ scanner to move the cantilever 102 while keeping the sample 110 stationary.

Regardless of whether the sample holder 113 of the probe holder 112 or both are used to move the probe relative to the surface of the sample, scanning is controlled by a programmed microcontroller or computer 114, which also analyzes measurement data and displays measurement information on display 116.

The AFM has a "contacting mode" of operation and a "non-contacting mode" of operation. In the "contacting mode" of operation, the tip 104 rides on the surface of a sample with an extremely light tracking force, on the order of $10^{-5}$ to $10^{-10}$ N. Profiles of the surface topography are obtained with extremely high resolution. Images showing the position of individual atoms are routinely obtained. In the second non-contacting mode of operation, the tip 104 is held a short distance, on the order of 5 to 500 Angstroms, from the surface of a sample and is deflected by various forces between the sample and the tip; such forces include electrostatic, magnetic, and van der Waals forces. In either mode of operation, measurements of the sample's surface topography or other characteristics are obtained by measuring deflection of the cantilever 102. Deflection of the cantilever is usually measured using precisely aligned optical components 120 coupled to a deflection measurement circuit 122, although other techniques are sometimes used.

Atomic force microscopy is capable of imaging conductive as well as insulating surfaces with atomic resolution. Typical AFM's have a sensitivity of 0.1 Angstrom in the measurement of displacement.

Combined Near Field Scanning Optical Microscope and Atomic Force Microscope Apparatus The microscope 100 shown in FIG. 1 combines NSOM and AFM measurement modalities. Near field scanning optical microscopy is an analysis tool that can be used either alone, or in conjunction with AFM to analyze the topography and material characteristics of a substrate or other target object. The microscope is operable with both conducting and insulating surfaces, and can be used to detect impurity atoms in a sample near the surface, such as those placed in a sample using ion implantation.

As noted above, this microscope assembly 100 has a scanning and measurement controller 114, a cantilever 102 with a substantially transparent or photosensitive sharp tip probe 104 positioned over a sample 110, cantilever deflection measurement optics 120 and a cantilever deflection measurement circuit 122 for AFM operation.

The cantilever 102 in assembly 100 differs from conventional AFM cantilevers in that it includes a photodiode 130 (also herein called a photosensor or photosensitive region of the cantilever) in the vicinity of the tip 104 and an electrode 132 or equivalent low impedance connector that couples the photodiode 130 to a photodiode current measurement circuit 140. Alternately, the tip can itself be part of the photodiode.

Combined STM and NSOM Microscope Assembly

Figure 2:
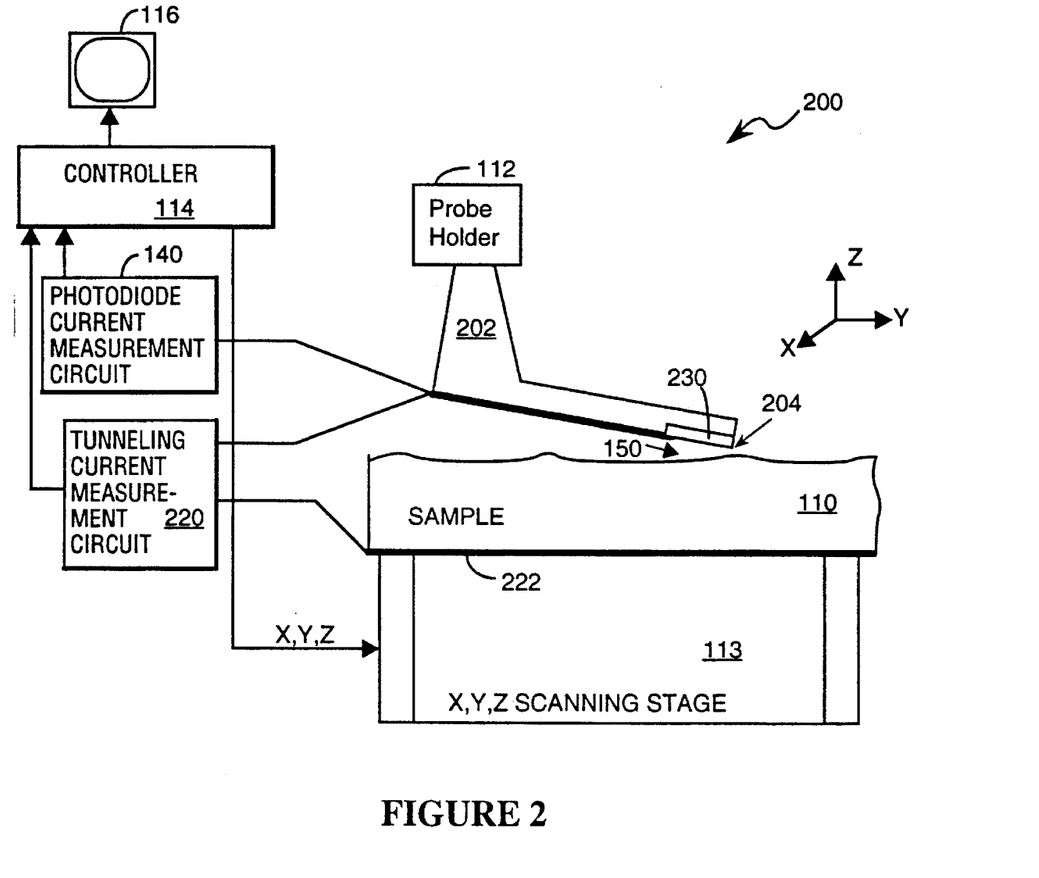
FIG. 2 is a block diagram of a combined AFM/NSOM microscope in accordance with the present invention.

Referring to FIG. 2, conventional scanning tunneling microscopes (STMs) are used primarily to monitor the electronic character of the surfaces being scanned. The STM/NSOM assembly 200 has a cantilever 202 with a conductive tip 204. In this example the tip 204 is the apex of the cantilever 202 and is also used as the point at which tunneling current enters the STM probe from the sample 110. In other embodiments of the present invention the tip can be a projecting, conductive tip that projects away from the cantilever 202.

Tunneling currents in conductive or semiconductor samples are induced by placing a conductive tip 204 one to ten Angstroms above the sample 110, and introducing a low voltage electric field (typically less than one volt) between a conductive tip 204 and the sample 110, which is mounted on a metal plate 222 for ease of electrical connection to the sample. Tunnelling current, drawn from the tip through the one to ten angstrom gap 150 between the tip 204 and sample 110, is indicative of the size of the gap 150. STMs typically have two modes of operation. The first is constant height mode, for very flat samples, in which the tip is scanned at a constant height and the tunneling current is measured to determine the topography of the sample. The second mode is constant current mode, in which tunneling current is kept constant by varying the height of the cantilever until a preselected current level is restored.

A tunneling current measurement circuitry 220, coupled to both the tip 204 and the sample 110, controls the assertion of a current inducing voltage on the tip 204 and measures the magnitude of the resulting tunneling current. The measurement data, or images generated from that data, are displayed on display device 116 after appropriate processing by the controller 114.

The cantilever 202 includes a photodiode 230 at its end. The doping required to form the photodiode 230 also makes the apex of the cantilever conductive. As a result, the photodiode 230 is can be used both as a photodiode for near field scanning optical microscopy and as a conductor for scanning tunneling microscopy. As a result, the photodiode 230 region of the cantilever 202 is coupled to both a tunneling current measurement circuit 220 and a photodiode current measurement circuit 140, only one of which is used at any one time depending on the type of measurements being taken.

Cantilever Configurations

Figure 3A:
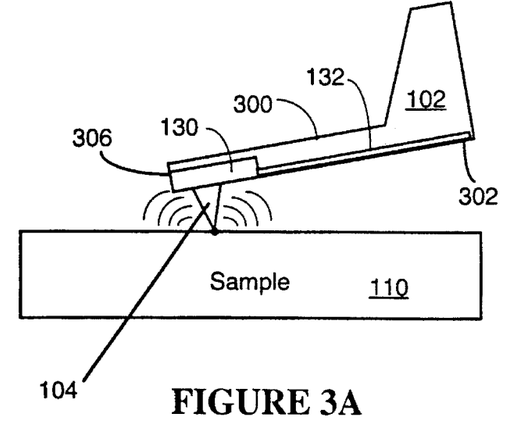
FIG. 3A is a cross sectional view of a cantilever in accordance with the present invention.

Referring now to FIG. 3A, the substantially "L"-shaped AFM/NSOM cantilever 102 includes an upper surface 300 and lower surface 302. The cantilever in a first preferred embodiment is made from a silicon substrate in order to take advantage of its transparency and semi-conductor properties. A photodiode 130 is disposed at a first end 306 of the cantilever 102. In the preferred embodiment, the photodiode is a PN junction diode created by doping a N-type substrate with Boron, or by doping a P-type substrate with phosphorous. When a silicon substrate is used to make the cantilever 102, the photodiode 130 may be formed directly in the silicon substrate. Alternatively, a silicon nitride or silicon dioxide substrate (either alone or formed on top of an underlying glass support substrate) can be used with a polysilicon or amorphous silicon film on the surface of the cantilever for forming the PN junction of the photodiode 130. The silicon nitride or silicon dioxide variations can be manufactured less expensively than the pure silicon cantilevers and as such are ideal for manufacturing large arrays of photosensitive cantilevers.

Figure 3B:
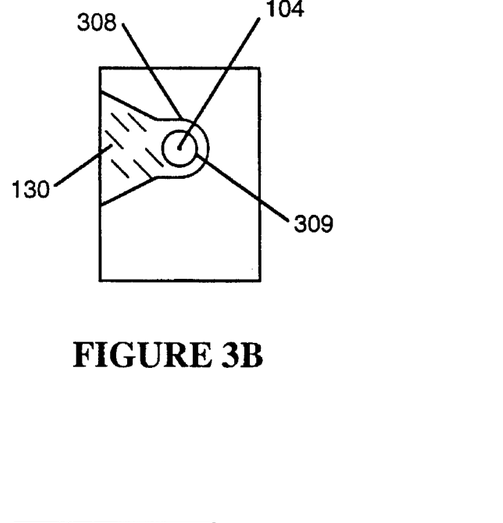
FIG. 3B is a top view of the cantilever of FIG. 3A.

Disposed on the photodiode 130 and extending away from the cantilever 102 is the probe tip 104. As shown in FIGS. 3A and 3B, in one preferred embodiment the photo diode 130 encircles and includes an extended region 308 (see which extends radially beyond the probe tip base region 309. The probe tip 104 is constructed out of transparent materials and serves to transmit the scattered light induced by the probe's presence in an evanescent field through the probe 102 to the photodiode 130 directly. The scattered light transmitted through the probe 102 will induce current flow in the photodiode 130, transforming the optical energy into an electrical signal which may be transmitted through an electrode 132 for processing by a data collection system.

Those ordinarily skilled in the art will recognize that with the photodiode of the present invention, the adjustment and screening pin-hole configuration of the prior art is not required. This is because of the close proximity between the photodiode and the sample as provided in the present invention. However, if reflections from the optical positioning system result in measurement errors in the photodiode system, means for differentiating the light sources may be employed. The optical cantilever positioning system (including cantilever deflection measurement optics 120 and a cantilever deflection measurement circuit 122) discussed above may utilize a different color light than detectable by the photodiode 130. In addition, time division or frequency division multiplexing may be utilized to differentiate the light sources.

Figure 4:
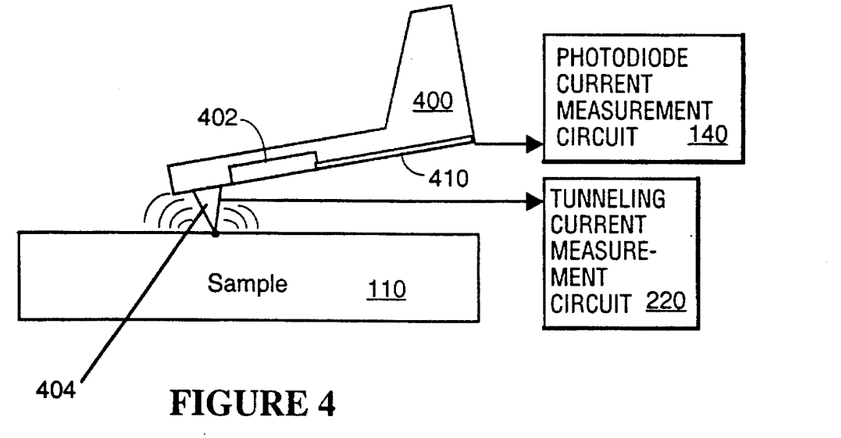
FIG. 4 is a cross sectional view of a cantilever in accordance with an alternate embodiment of the present invention.

An alternative embodiment cantilever 400 is shown in FIG. 4. The cantilever 400 includes an offset photodiode 402 adjacent to the probe tip 404. In this configuration, scattered light is collected due to the probe tip's interference with the induced surface field over the sample. In this configuration, light is not required to be directly transmitted through the probe tip 404, and instead is directly collected by means of the photodiode 402. This offset photodiode configuration is well suited for STM/NSOM applications in which the two modes of operation are a scanning tunneling mode and a near field optical mode.

Thus, in the configuration of FIG. 4, the probe's tip 404 may be metal coated or doped so as to render the tip 404 semi-opaque and conductive.

In this configuration, light scattered by the probe may still be collected due to the close proximity of the photodiode 402 to the sample surface. The photodiode 402 is connected to a photodiode current measurement circuit via an electrode 410 while the conductive probe tip 404 is connected to a tunneling current measurement circuit 220.

Figure 5:
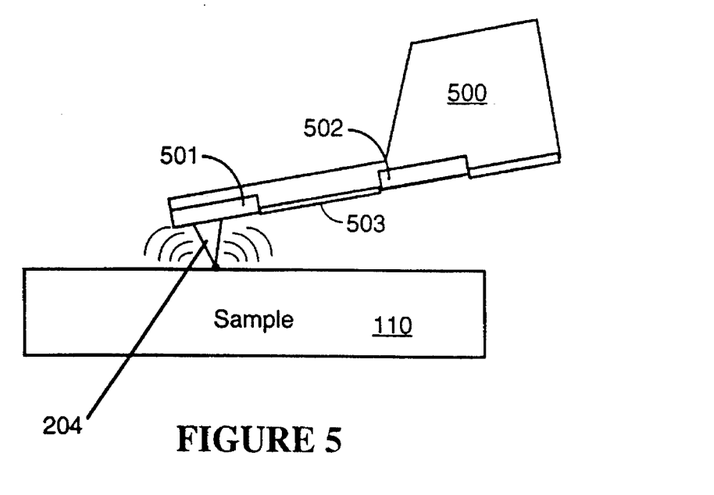
FIG. 5 is a cross sectional view of a cantilever including an embedded electronic signal conditioning circuit in accordance with the present invention.

FIG. 5 shows a cantilever 500 including a photodiode 501 and electronics 502 formed on the same substrate as the cantilever. Electronics 502 include amplifiers and signal conditioning apparatus for pre-processing the photodiode signals generated as the photodiode 501 is exposed to scattered light. In this embodiment, improved signal to noise ratios can be achieved by boosting and/or processing the photodiode signals prior their exposure to extraneous noise, allowing for better system performance. The electronics 502 are disposed in and/or on the cantilever substrate material and are in electrical communication with the photodiode 501 by means of electrode 503. Those ordinarily skilled in the art will recognize that any of a variety of semiconductor devices may be formed in the cantilever structure disclosed thereby maintaining the electronics in close proximity to the photodiode 501 for signal processing purposes.

Figure 6A:
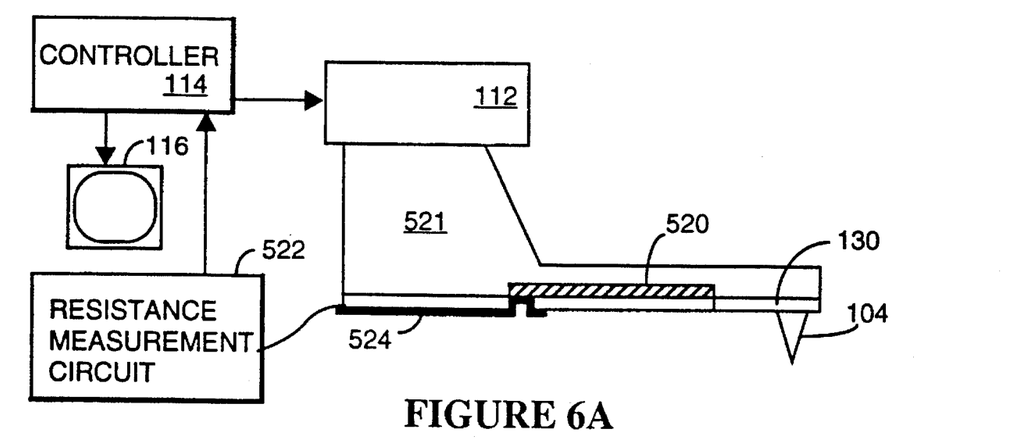
FIGS. 6A and 6B are a cross sectional view and a bottom plan view, respectively, of a cantilever including an embedded piezoresistive sensor as well as a photodiode sensor.
Figure 6B:
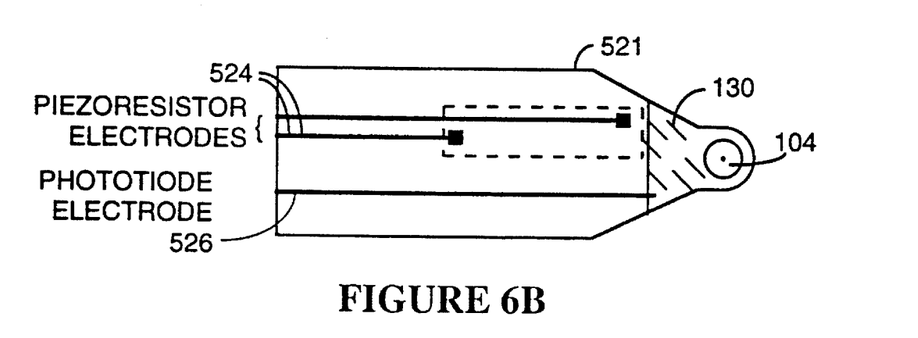
Figure 7:
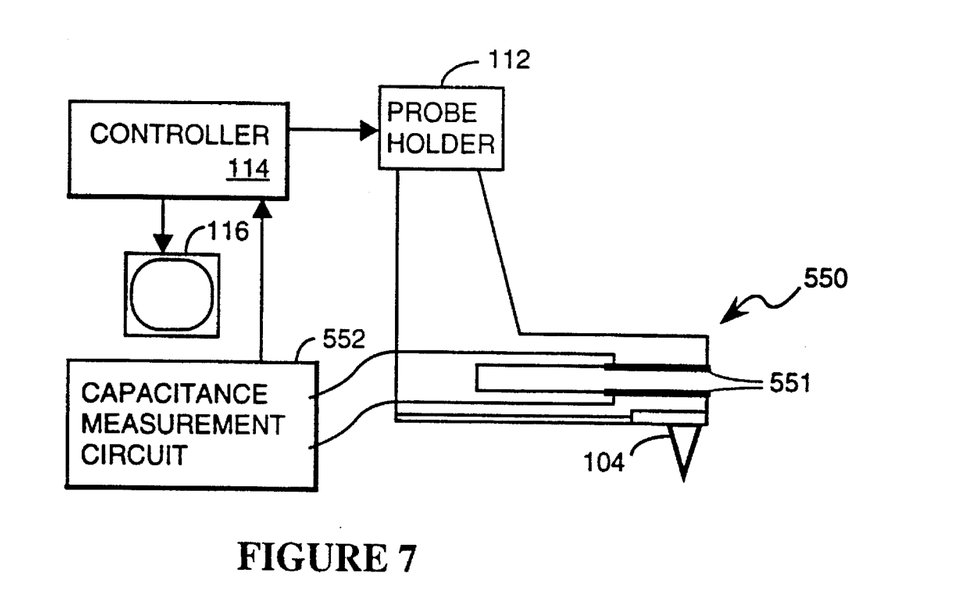
FIG. 7 is a cross sectional of a double level (dual arm) cantilever whose two parallel arms form a capacitive sensor for monitoring deflections of the cantilever.

Alternatively, other means for detecting the deflections in the cantilever arm in lieu of the optical positioning system disclosed above may be selected. One such means, shown in FIGS. 6A and 6B, includes a piezoresistive sensor 520 embedded into a cantilever 521 as described in PCT Patent Document WO 9212398, published Jul. 23, 1992 (PCT Application No. 91US9759) which is incorporated herein by reference. The piezoresistive sensor 520 is coupled to a resistance measurement circuit 522 by a pair of electrodes 524, while the photodiode region is coupled to a distinct electrode 526. A second cantilever deflection detection apparatus, shown in FIG. 7, uses capacitive sensing wherein a double level cantilever 550 forms a capacitive sensor for monitoring the deflections in the cantilever. Capacitor plates 551 on the two arms are coupled by electrodes to a capacitance measurement circuit 552. The resistance measurements for the apparatus shown in FIGS. 6A–6B and the capacitance measurements for the apparatus shown in FIG. 7 correspond directly to deflections of the cantilever by either physical contact with a sample or by van der Waals forces. These and other means may be utilized as is known in the art without departing from the spirit of the present invention.

Cantilever Manufacturing Process

Figure 8A:
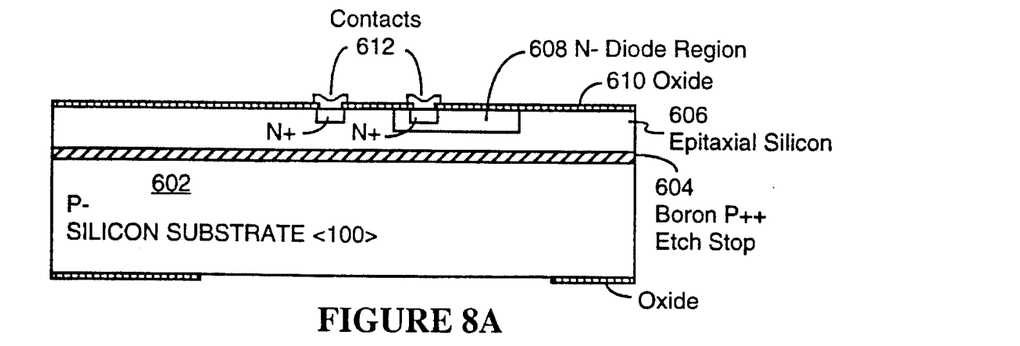
FIGS. 8A–8D depict a sequence of steps for manufacturing a cantilever in accordance with the present invention.

Referring to FIG. 8A, the first step of the manufacturing process is to provide a substrate 602, such as a lightly doped P-<100> silicon wafer. Silicon epitaxy is used to grow an etch stop layer 604 as well as a lightly doped epitaxial layer 606 used for fabrication of electronic devices. The etch stop layer is 1 μm thick and doped to $3 \times 10^{20}$ cm$^{-3}$ with boron and germanium. Boron doping in excess of $10^{20}$ cm$^{-3}$ reduces the etch rate of silicon in ethylene diamine pyrocatecol (EDP) by approximately 300 times. Germanium is included to reduce the residual stress caused by the mismatch of lattice constants of silicon and boron. A 5 μm thick layer of lightly P- boron doped ($3 \times 10^{15}$ cm$^{-3}$) silicon is grown over the etch stop layer.

A PN junction photodiode is fabricated by ion implanting $10^{18}$ cm$^{-3}$ phosphorus into the lightly doped P- type surface epitaxial layer to form an N- region 608. The cross-section of the photodiode is approximately 50 μm$^2$. The wafer is then thermally oxidized to create an oxide film 610 which serves as both an anti-reflection coating for the photodiode as well as a passivation layer. Openings in the oxide layer are created and contact vias are formed. After annealing, windows are patterned in the back side of the wafer using a dual-sided aligner. The back side windows are used in the final stages of the manufacturing process to completely etch away the silicon under the cantilevers to yield free-standing structures.

Then 500 nm of aluminum are sputtered on the wafer and patterned into contact pads 612 and metal lines (not shown). This gets us to the configuration shown in FIG. 8A.

Figure 8B:
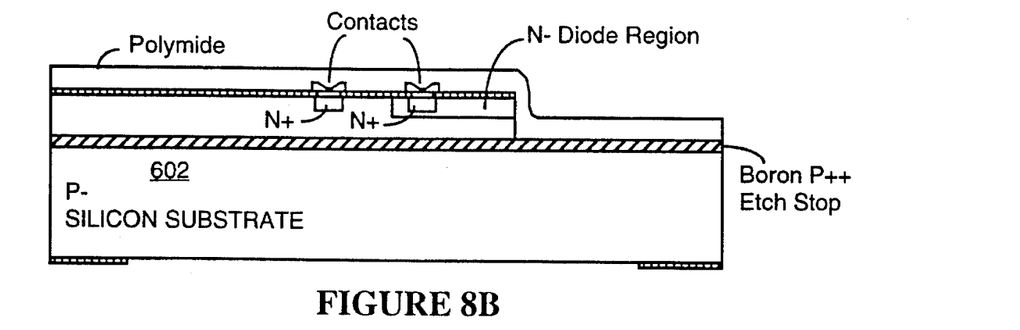

Next, the actual shape of the cantilever is created by patterning a 6 μm thick film of AZ 4620 photoresist. The resist is baked for over 2 hours at up to 200° C. and acts as a masking material with 5 μm of silicon are etched in a SF$_6$ plasma. After dry etching, the cantilever shape is completely defined and the photodiodes are fully functional. In order to free the cantilever from the substrate, the front of the wafer is coated with approximately 50 μm of Hitachi PIX3500 polyimide and baked over six hours at temperatures up to 400° C. A cross section view of the wafer at this point in the manufacturing process is shown in FIG. 8B.

Figure 8C:
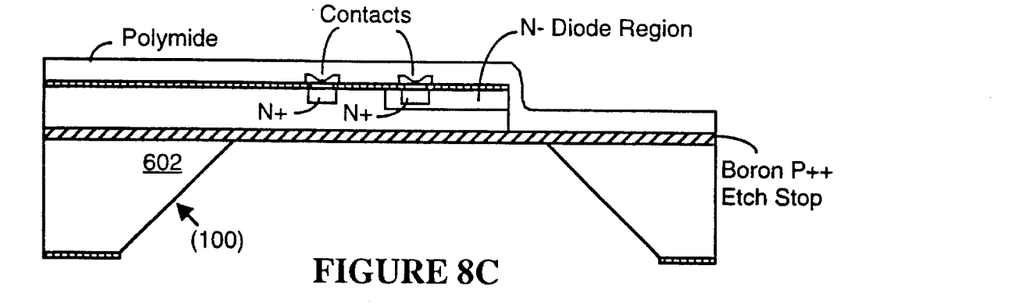

The wafer is then etched in EDP at 105° C. until the etch stop layer 604 is reached, leaving 5 μm thick cantilevers resting on the 1 m thick silicon membranes. This is an anisotropic etch that leaves the remaining portion of the supporting wafer with walls sloped along the (100) crystallographic plane. FIG. 8C shows the wafer after the anisotropic etch.

Figure 8D:
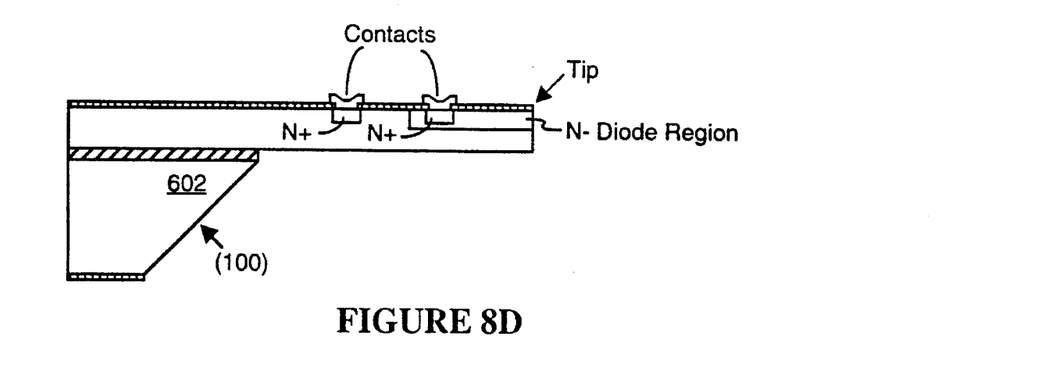

The silicon membranes are removed by dry etching from the back side. The polyimide film is removed in an oxygen plasma. Individual cantilevers are then broken off the wafer, producing cantilevers as shown in FIG. 8D.

The resulting cantilevers are typically bonded to support posts for ease of mounting to a probe holder. A four inch wafer using the above process yields several hundreds of cantilevers. For simplicity, the tips for the cantilevers produced by the above described process are the apex of the cantilevers themselves.

In alternate embodiments, a protruding sharp tip can be manufactured separately and bonded to the cantilevers, or can be fabricated directly on the wafer substrate (prior to the photodiode doping step of the manufacturing process described above) at positions that will subsequently become the ends of cantilevers. The cantilever's tip should have a radius of curvature less than 500 Angstroms and preferably less than 250 Angstroms. The final sharpness of the tip is typically determined by the sharpening effect of a low temperature oxidation.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A near field optical microscope assembly, comprising:

a microminiature cantilever arm having an upper surface and a lower surface;

a sharp tip on said lower surface of said cantilever arm;

at least a portion of said cantilever arm comprising photosensitive material that converts any photons impinging thereon into electrical current; and signal processing circuitry, electrically coupled to said photosensitive material, for receiving and processing said electrical current.

2. The microscope assembly of claim 1, wherein said cantilever is substantially transparent.

3. The microscope assembly of claim 1, wherein said sharp tip is substantially transparent.

4. The microscope assembly of claim 1, wherein said cantilever is made primarily from P-type silicon and said photosensitive thin film comprises a portion of said silicon cantilever doped with a N-type dopant.

5. The microscope assembly of claim 1, further including cantilever positioning detection apparatus for detecting deflection of said cantilever when said cantilever is brought into contact with a sample.

6. The microscope assembly of claim 1, further including a sample holder for holding a material sample in close proximity to said cantilever's sharp tip; and cantilever positioning detection apparatus for detecting deflection of said cantilever when said cantilever is brought into contact with said sample.

7. The microscope assembly of claim 1, further including positioning means for positioning said sharp tip with respect to a target object so as to bring said sharp tip into contact with said target object.

8. The microscope assembly of claim 1, further including excitation apparatus for applying optical stimulus to said target object so as to generate an evanescent light wave on the surface of said target object.

9. The near field optical microscope of claim 1 wherein at least a portion of said signal processing circuitry is integral with said cantilever arm.

10. The near field optical microscope of claim 1 wherein said sharp tip of said cantilever arm overlays at least a portion of said photosensitive material.

11. The near field optical microscope of claim 1 wherein said photosensitive material includes a diode junction.

12. The near field optical microscope of claim 1 wherein said sharp tip of said cantilever arm is offset from said portion of said cantilever arm comprising photosensitive material.

13. A cantilever assembly, comprising:

a microminiature cantilever arm having an upper surface and a lower surface;

a sharp tip on said surface of said cantilever arm;

at least a portion of said cantilever arm comprising photosensitive material that converts any photons impinging thereon into electrical current; and a low impedance electrode coupled to said photosensitive material, for transmitting said electrical current.

14. The cantilever assembly of claim 13 wherein said cantilever arm has a piezoresistive sensor embedded therein and electrodes coupled to said piezoresistive sensor for measurement of said piezoresistive sensor's resistance.

15. The cantilever assembly of claim 13 wherein said cantilever arm includes two parallel arms forming a capacitive sensor, and electrodes coupled to said two parallel arms for measurement of said capacitive sensor's capacitance.

16. A near field optical microscope assembly, comprising:

a probe having a lower surface;

a sharp tip on said lower surface of said probe;

at least a portion of said probe comprising photosensitive material that converts photons impinging thereon into electrical current;

optical excitation apparatus for applying an optical excitation signal to a target object;

a signal receiver for receiving said electrical signals;

positioning apparatus that positions said sharp tip with respect to said target object; and control means, coupled to said excitation apparatus, said signal receiver and said positioning apparatus, for controlling movement of said sharp tip so as to scan said target object, and for measuring characteristics of said target object at various positions thereof by processing said received electrical signal.

17. The near field optical microscope of claim 16 wherein said portion of said cantilever arm comprising photosensitive material includes an extended portion disposed on said lower surface and extending radially from a base of said sharp tip wherein said extended portion collects light scattered away from said sharp tip.

18. A method of performing optical microscopy, the steps of the method comprising:

positioning, in close proximity over a target object, a cantilever arm having an upper surface and a lower surface, said cantilever arm having a sharp tip on its lower surface wherein at least a portion of said cantilever arm is photosensitive;

applying optical stimulus to said target object so as to generate light in the vicinity of said target object;

collecting via said photosensitive portion of said cantilever arm photons from said generated light and converting said received photons into an electrical signal; and receiving and processing said electrical signal so as to generate an image.

19. The method of claim 18, further including moving said sharp tip so as to scan said target object and receiving and processing said electrical signal generated by said photosensitive portion of said sharp tip so as to generate an image representative of at least a portion of said target object.

20. A method of performing optical microscopy, the steps of the method comprising:

positioning, in close proximity over a target object, a cantilever arm having an upper surface and a lower surface, said cantilever arm having a sharp tip on its lower surface wherein at least a portion of said cantilever arm is photosensitive;

applying optical stimulus to said target object so as to generate an evanescent light wave on the surface of said target object;

collecting scattered light generated by interference of said probe tip with said light wave, said photosensitive portion of said cantilever arm receiving photons from said scattered light and converting said received photons into an electrical signal;

receiving and processing said electrical signal so as to generate an image.

21. The method of claim 20, further including moving said sharp tip so as to scan said target object and receiving and processing said electrical signal generated by said photosensitive portion of said sharp tip so as to generate an image representative of at least a portion of said target object.

* * * * *